Sept. 22, 1970  G. D. BOYD ET AL  3,530,301
NONLINEAR OPTICAL DEVICES EMPLOYING OPTIMIZED FOCUSING
Filed March 14, 1968  2 Sheets-Sheet 1

$$1.5 - 0.5 \left(\frac{\rho^2 \ell n_3}{2\delta_0 W_0 n_0}\right)^{1/8} \leq \frac{\ell \delta_0}{2W_0} \leq 6$$

$$1.5 - \left(\frac{\rho^2 \ell n_3}{2\delta_0 W_0 n_0}\right)^{1/8} \leq \frac{\ell \delta_0}{2W_0} \leq 6\left[1 + 10\left(\frac{\rho^2 \ell n_3}{2\delta_0 W_0 n_0}\right)^{1/8}\right]$$

INVENTORS G. D. BOYD
D. A. KLEINMAN
BY

ATTORNEY

United States Patent Office 3,530,301
Patented Sept. 22, 1970

3,530,301
NONLINEAR OPTICAL DEVICES EMPLOYING OPTIMIZED FOCUSING
Gary D. Boyd, Rumson, and David A. Kleinman, Plainfield, N.J., assignors to Bell Telephone Laboratories, Incorporated, Murray Hill and Berkeley Heights, N.J., a corporation of New York
Filed Mar. 14, 1968, Ser. No. 713,055
Int. Cl. H03f 7/00
U.S. Cl. 307—88.3
10 Claims

ABSTRACT OF THE DISCLOSURE

Optimum focusing is disclosed for various optical parametric devices, harmonic generators and nonparametric nonlinear mixers, such as sum-frequency mixers. It is found that, in each case, optimum focusing resides in a range of a focusing parameter which is not intuitively obvious because of the complex inter-relationship of the advantages of increased beam intensity provided by sharper focusing and the disadvantages of more rapid divergence due to diffraction caused by the sharper focusing. Moreover, in some resonant cases in which crystal losses are appreciable, it is shown that there exists an optimum optical path length in the body of nonlinear material.

BACKGROUND OF THE INVENTION

Traveling-wave nonlinear optical devices, such as parametric amplifiers, parametric oscillators and parametric mixers, harmonic generators and nonparametric mixers such as sum-frequency mixers, have been the subject of intensive recent research and development. Unfortunately, this research and development has occurred largely on a hit-or-miss basis. That is, it has typically used the most easily obtained experimental arrangements because of the great difficulty involved in the theoretical analysis of such devices.

In a long series of discoveries, it has gradually developed that phase-matching of the optical beams involved in nonlinear devices is generally desirable, although slightly mismatched conditions may yield an advantage in certain circumstances. It has also been found that a focused beam can frequently provide a stronger nonlinear optical interaction than an unfocused beam.

A parametric device is usually understood to be a nonlinear optical device in which the highest frequency wave is also the most powerful, that is, the pump. To avoid confusion, we shall use the phrase "nonlinear optical device" as the generic description for all devices to which our invention applies, regardless of the relative frequencies of the pump and the other waves. Such devices all employ a reactively nonlinear interaction in a distributed bulk of optical material with relatively small losses of the supplied optical energy to heat. Preferably, the interaction is a traveling-wave interaction, in that it can occur throughout an indefinitely large optical path length.

Phase-matching is that condition in the propagation of a multiplicity of optical waves through a medium which provides that the vector sum of the propagation constants of some of them is equal to the vector propagation constant of another, or the sum of the vector propagation constants of the others. These vector propagation constants have a numerical value equal to the angular frequencies of the respective waves times the indices of refraction of the medium for those waves divided by the velocity of light. Much of the mathematics of nonlinear interaction is most readily described in terms of these propagation constants, which are sometimes called wave vectors. For the purpose of describing optimum focusing and claiming our invention, we shall endeavor to describe the various relationships pertinent to optimum focusing in terms of geometrical parameters of the arrangement which are readily demonstrated and measured and which eliminate the propagation constants from the equations. These parameters will include the minimum beam diameter, called the beam waist, $2w_0$, of a beam whose frequency is one-half the highest frequency in the interaction (i.e., half the pump frequency in a parametric interaction). They further include the corresponding beam divergence angle, $\delta_0$, produced by diffraction, the double refraction angle $\rho$ and the effective path length $l$ of the interaction in the body of the optical non-linear material. In particular, hereinafter we will frequently employ a focusing parameter, $$\xi = \frac{l\delta_0}{2w_0}$$

and a double refraction parameter $$B = \left[\frac{\rho^2 l n_3}{2\delta_0 w_0 n_0}\right]^{1/2}$$

where $n_3$ is the index of refraction for the pump frequency and $n_0$ is the index of refraction for the frequency that is one-half the highest frequency in the interaction. The focusing parameter, which we will designate $\xi$ hereinafter for brevity, and the double refraction parameter, which we will hereinafter designate B for brevity, can be shown to be independent. In essence, the focusing parameter describes the length of the crystal with respect to the beam shape; and the double refraction parameter describes the double refraction angle with respect to the other parameters upon which the strength of its effect depends. The beam shape depends on the initial size or shape of the beam and the focusing power of the lens or lenses used.

In our prior paper with A. Ashkin, Physical Review, volume 145, page 338 (1966), we have considered cases in which the focusing parameter is much greater than unity. This choice was made for ease of analysis; but did not necessarily represent a feasible embodiment of an operative device. We now know that focusing parameters much greater than unity and the associated great path lengths, in themselves, do not provide optimum conditions.

In our prior paper with A. Ashkin and J. Dziedzic, Physical Review, volume 137, page A1305 (1965), we have considered focusing parameters which are much less than unity. In fact, this is the typical experimental case because obtainable optical quality crystals are typically small and focusing is typically relatively weak. In the prior paper of one of us, G. D. Boyd, with A. Ashkin, Physical Review, volume 146, page 187 (1966), double retraction was eliminated in a special way and a calculation was presented for a focusing parameter of unity. This calculation was presented with the general teaching that, with focusing parameters this large, the effects of diffraction are quite significant and must be taken into account.

Nevertheless, there has been no theory heretofore which has been able to account fully for the effects of diffraction and/or double refraction. The only previous article which has dealt explicity with the optimization of focusing in the presence of significant double refraction and diffraction is the paper by J. E. Bjorkholm, Physical Review, volume 142, page 126 (1966). His analysis applies only to nonresonant second harmonic generation and is approximate and inexact in ways which make it valid only for relatively large values of the double refraction parameter ($B>2$). His integral expression for the second harmonic power generated is exact only for the case of ordinary phase-matching, $\Delta k=0$, which we now know to be nonoptimum in the general case. When B is larger ($B>2$), corresponding to the usual situation of reasonably thick crystals ($l>.2$ cm.) with significant double refraction, and when phase-matching occurs far from 90° with respect to the optic axis, there is negligible difference between ordinary and optimum phase-matching. This is the case for three of the four curves computed by Bjorkholm; and for these cases, for second harmonic generation, our theory is in excellent agreement with his computations and also his measurements. Nevertheless, when B is small, either because of small double refraction angle $\rho$ or small $l$, his analysis is no longer valid. His estimate of the optimum focusing parameter $\xi_m$ is not exact but is based on the intersection of asymptotic relations. The erroneous conclusion that $\xi_m$ is independent of the double refraction parameter B followed from an asymptotic expression for the region of strong focusing ($\xi \gg 1$) that was too small by a factor of 4. His recipe for maximum power gives only 54 percent of the true maximum power, which can be obtained through our invention. Moreover, it cannot be established from his analysis how the optimum relationships for second harmonic generation are related to the optimum relationships for parametric generation, parametric amplification and parametric mixing and for nonparametric mixing such as sum mixing.

SUMMARY OF THE INVENTION

According to our invention, we have recognized that substantially optimum focusing can be achieved in a traveling-wave nonlinear optical device by providing a focusing parameter which lies in a range centered at 2.84 for no double refraction ($B=0$) and is centered at successively lower values down to about unity fonr $B=2$. Moreover, for resonant interactions, including resonant second harmonic generation, we have found that the theoretical optimum ranges of the focusing parameters are unexpectedly different from the nonresonant cases analyzed by Bjorkholm.

According to one aspect of our invention, the limits of the optimum range of the focusing parameter depend upon the resonance conditions for the nonlinear interaction. One set of optimum ranges exists for nonresonant, or single-pass interactions; and a different set of optimum ranges exists for highly resonant nonlinear interactions in which an optical resonator is provided having reflectors of reflectivities substantially exceeding the respective sums of their transmissions and reflector losses. For example, in the nonresonant case, the focusing parameter $\xi$ should be greater than 1.5 minus $qB^{1/4}$ and should be less than $6[1+rB^{1/4}]$, where $q$ equals 0.5 and $r$ equals 0. In the case of the highly resonant interaction, $q$ equals unity and $r$ equals 10. Therefore, these ranges depend upon the fourth root of B. It is seen that $q$ and $r$ are parameters related to resonance conditions for the nonlinear interaction and that they are non-negative real numbers.

It is one aspect of our invention that it teaches a new relationship among the geometrical parameters determining optimized focusing for all different types of nonlinear interactions, e.g. parametric interactions, harmonic generation, and sum mixing. This teaching is applicable equally to both positive and negative uniaxial crystals and also biaxial crystals of optically nonlinear material. A subsidiary aspect of this teaching is that the principal difference among different interactions, with respect to optimized focusing, is the presence or absence of resonance conditions for the nonlinear interactions; that is, the principal difference is determined by the presence or absence of an optical resonator. We have found that this is true in spite of the fact that, in harmonic generation and mixing, one can calculate the generated powers without regard to the so-called pump power thresholds which must be taken into account in parametric oscillation.

For resonant parametric devices, our invention encompasses optimized focusing for the entire range of the double refraction parameter B.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

Nonresonant embodiments

Figure 1:
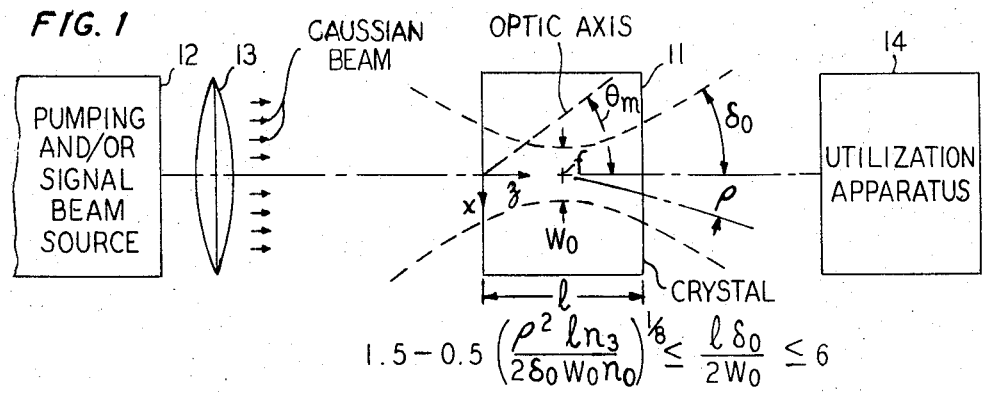
FIG. 1 is a partially pictorial and partially block diagrammatic illustration of a nonresonant embodiment of the invention.

In the embodiment of FIG. 1, a traveling-wave nonlinear optical interaction in a body 11 of appropriate optically nonlinear transparent material is to be optimized with respect to the focusing of the beam of coherent radiation supplied from a source 12 by selection of appropriate focusing, such as provided by the lens 13. With optimized focusing, the utilization apparatus 14 will receive the greatest amount of usable power at the desired output frequency. The geometrical parameters pertinent to the optimization of focusing are indicated on the pictorial showing of body 11. These are the effective path length $l$ of the intreaction in body 11, the divergence angle $\delta_0$ of the beam within the medium, the double refraction angle $\rho$ and the beam waist diameter $2w_0$, as defined above, both within the medium. Another pertinent parameter is the location of the focus $f$, which is at the center of the waist of the beam, as a function of the axial coordinate $z$. Since our theory shows that in nearly all cases the value of $f$ should be $l/2$, we need not treat $f$ as a variable for purposes of this application. In general, $\delta_0$ and $w_0$ are not independent, inasmuch as $\delta_0$ is typically the angle determined by diffraction of the beam and therefore is inversely related to $w_0$. For an essentially collimated beam of a given diameter, the waist $2w_0$ of the focused beam after passage through a lens 13 depends inversely upon the focal power (itself inversely related to the focal length) of the lens 13 and directly upon the wavelength of the beam. These relationships are well known to those skilled in the optics and quantum electronics arts. Despite the interdependence of $\delta_0$ and $w_0$, we employ both of these quantities in order to eliminate propagation constants from the pertinent geometrical relationships. The double refraction angle $\rho$ is a function of the angle $\theta_m$ of propagation of the beam with respect to the indicated optic axis of the body 11. The angle $\rho$ will be nonzero when $\theta_m$ is not 90° or 0°.

There is an optimum focusing condition because of the following considerations. On the one hand, stronger focusing of the beam produces greater light intensities in the body 11 and provides a more efficient interaction at the beam waist. On the other hand, the over-all result may have reduced efficiency if the increase of the diffraction angle $\delta_0$ causes the intensities to fall off so rapidly to either side of the beam focus that the path length $l$ is inefficiently utilized. Thus, the optimum focusing is related to the shape of the beam and its path length in the crystal.

We have found it convenient to work with a focusing parameter $\xi$ which equals $l\delta_0/2w_0$ and a double refraction parameter B which equals $$\left[\frac{\rho^2 l n_3}{2\delta_0 w_0 n_0}\right]^{1/2}$$

In all the embodiments to be described hereinafter, the nonlinear crystals employed are essentially transparent to the pumping radiations and generated radiations. This condition is typically achieved when their free charge carrier concentrations are low enough that the measured loss is of the order of, or less than, three (3) reciprocal centimeters, which will produce about 37 percent power loss in a path about 0.3 centimeter long. Lower losses are, of course, preferred.

For the nonresonant embodiment of FIG. 1, which could be a harmonic generator if source 12 supplies only one beam or could be a nonresonant mixer if source 12 supplies two beams of coherent radiation of different frequencies, optimum focusing is defined by a single range of the focusing parameter as labeled on the drawing for FIG. 1, that is is $$1.5-0.5B^{1/4} \leq \xi \leq 6 \quad (1)$$

It is inherent in our theory and in this result that the optimum condition is obtained when all of the supplied beams of coherent radiation have the same focusing parameter. It will be noted that, for arbitrary values of the double refraction parameter B, the limits of the range of the optimum focusing parameter $\xi$ depend upon the fourth root of the double refraction parameter in the approximate functional form (1) we have chosen to represent the broad maximums of the curves.

Figure 2:
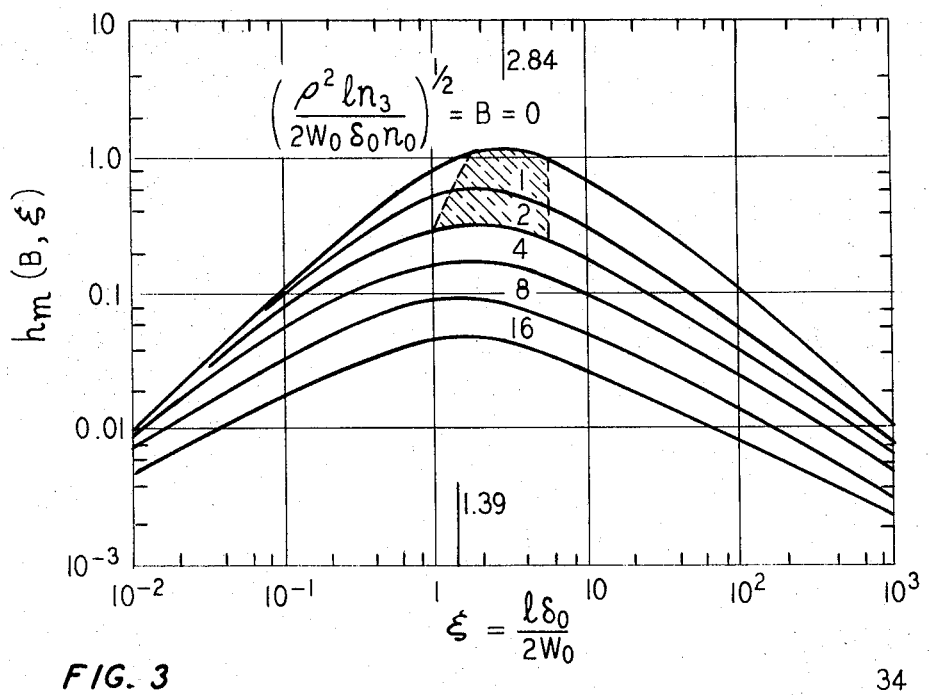
FIG. 2 shows curves which are useful in defining the ranges of optimum focusing for nonresonant interactions.

The range of the focusing parameter $\xi$ defined by Equation 1 is shown graphically by the shaded areas on the curves of FIG. 2 for $B \leq 2$. In FIG. 2, the parameter $h_m(B,\xi)$ is the geometrically variable portion of the expression for generated power assuming a crystal of length $l$ in nonresonant interactions. The generated power is approximately proportional to $l \cdot h_m(B,\xi)$. The actual value of the parameter $h_m$ is unimportant for present purposes. Only its shape for the constant values of double refraction parameter B is pertinent because the shape defines the optimum range of the focusing parameter $\xi$ which appears along the horizontal axis in FIG. 2.

Nonresonant second harmonic generator

Our first specific example for the nonresonant embodiment of FIG. 1 is a nonresonant second harmonic generator.

In this specific example, the body 11 is a crystal of tellurium having a very low concentration of free carriers, for example, a hole concentration equal to or less than $1 \times 10^{17}$ per cubic centimeter at room temperature. The pumping beam source is a carbon dioxide laser operating at 10.6 microns and the utilization apparatus is illustratively a detector at 5.3 microns. The setup is similar to that disclosed by C. K. N. Patel in his article "Efficient Phase-matched Harmonic Generation in Tellurium with a $CO_2$ Laser at 10.6 Microns," Physical Review Letters, volume 15, page 1027 (Dec. 27, 1965), but with the modification that focusing is optimized according to our invention.

The 10.6 micron pumping beam is propagated at an angle of about 14 degrees ($\theta_m=14°$) with respect to the optic axis polarized as an extraordinary wave (in the Y–Z plane); and the second harmonic propagates in the same direction polarized as an ordinary wave (along the X axis).

For an effective path length, $l$, within body 11 of 0.04 centimeter, we obtain $B=1.7$ and $\xi=1.65$. For the value of B employed, this optimized focusing ($\xi=1.65$) is quite different from any focusing suggested by the prior art.

Patel has demonstrated that phase-matching can be obtained in a crystal of tellurium for essentially all types of optically nonlinear processes therein, as disclosed and claimed in his copending patent application Ser. No. 515,981, filed Dec. 23. 1965 and assinged to the assignee hereof. Tellurium is a positive uniaxial crystal of class 32 ($D_3$) which is reasonably transparent in the infrared from about 5 microns to beyond 25 microns wave-length. The combination of tellurium and the carbon dioxide laser is particularly interesting because of the extremely large value of the nonlinear coefficient $d_{11}$ (Te). This coefficient equals $(1.27 \pm 0.2) \times 10^{-5}$ esu. (electrostatic units). The aforesaid combination is also particularly interesting because of the high power available continuously at 10.06 microns.

Nonresonant parametric amplification

Let us now analyze a specific example of non-resonant parametric amplification.

In this specific example, the body 11 is a crystal of tellurium having a very low concentration of free carriers, for example, a hole concentration equal to to or less than $1 \times 10^{17}$ per cubic centimeter at room temperature. The pumping beam source 12 is a carbon dioxide laser operating at 10.6 microns and the utilization apparatus 14 is a detector for detecting the amplified radiation at 17.9 microns. It may be noted that the idler wavelength is 25.9 microns. The setup is similar to that disclosed by C. K. N. Patel in his article "Parametric Amplification in the Far Infrared," Applied Physics Letters, volume 9, page 332 (November 1966), but with the modification that the focusing is optimized according to our invention.

Since the crystal is positive uniaxial, we consider the case in which the signal and generated idler waves are extraordinary waves and the supplied pump wave is an ordinary wave. The power transferred from the pump wave to the amplified signal can be shown to be a curve of the same shape with respect to the focusing parameter $\xi$ as one of the curves of FIG. 2. Because the nonlinear effect exists in tellurium only for double refraction parameters B which are nonzero, we find that for the above pump, signal and idler wavelengths that $\theta_m=7.2°$, $\rho=2.9°$ and for $l=0.11$ centimeters we have $B=1.0$. Therefore, optimum focusing in nonresonant parametric amplification in tellurium is described substantially accurately with respect to the geometrical factors by the "B-equals-$l$" curve of FIG. 2. We see from this curve that the optimum value of the focusing parameter $\xi$ in this nonresonant arrangement is about 1.9.

Resonant embodiments

Figure 3:
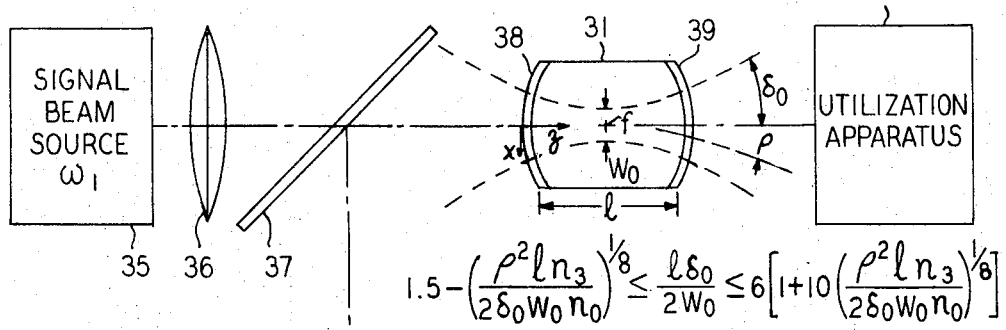
FIG. 3 is a partially pictorial and partially block diagrammatic illustration of a resonant embodiment of the invention.
Figure 3:
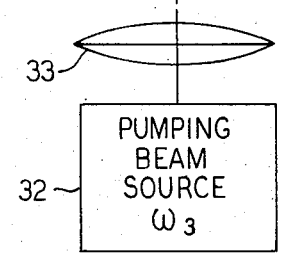

In the resonant embodiment of FIG. 3, the body 31 of the optically nonlinear substantially transparent material is disposed within the highly reflective members 38 and 39 which may be mirrors coated directly upon curved end surfaces of the body 31. For purposes of illustration, a mixing process is illustrated. The mixing process is driven by two supplied beams of coherent radiation, one from the pumping beam source 32 at the visible optical frequency $\omega_3$ and one modulated beam from the signal beam source 35 at an infrared frequency $\omega_1$. The beams are focused by lenses 33 and 36 respectively in order to have like shape, path lengths, and focusing parameters within the body 31. The pumping beam is partially reflected from a hybrid or beam splitter 37 into the body 31. The signal beam from source 35 is partially transmitted through the hybrid or beam splitter 37 into the body 31. The utilization apparatus 34 may illustratively be an optical detector adapted to detect the radiation generated at the difference frequency $\omega_2$ equals $\omega_3$ minus $\omega_1$. The optical resonator composed of reflective members 38 and 39 is made resonant at frequency $\omega_2$ but preferably not at the frequency $\omega_3$ of the pumping radiation.

With respect to the reflectivities of reflectors 38 and 39, there are two cases of general interest. In the case of the parametric oscillator, signal source 35 is absent; and reflectors 38 and 39 are typically made highly reflective at both the desired so-called signal frequency $\omega_1$ and the idler frequency $\omega_2$. In the case of the resonant parametric mixer or resonant sum-frequency mixer, the reflectors 38 and 39 are typically made highly reflective only at the desired output frequency. Nevertheless, with careful design and fabrication of the reflectors 38 and 39, it may be feasible to resonate one or more supplied radiations, as well as the generated radiations, in any of the foregoing cases.

One case of resonant parametric mixing is of particular interest because it enables conversion of an optical frequency to a higher frequency. This is called up-conversion. Sum-frequency mixing also provides up-conversion. Up-conversion is very desirable when a supplied modulated signal radiation of frequency $\omega_1$ is an infrared radiation because infrared radiations are not easily detectable with conventional photodetectors and photomultipliers. Specifically, infrared radiations are preferably up-converted to a visible radiation or a radiation very near the edge of the visible spectrum. For parametric mixing, the generated frequency $\omega_2 = \omega_3 - \omega_1$, where $\omega_3$ is the pump frequency. For up-conversion, $\omega_2 > \omega_1$. For sum-frequency mixing, $\omega_2 = \omega_3 + \omega_1$; and up-conversion is obtained in all cases.

Our principal result with respect to resonant embodiments of optically nonlinear devices as shown in FIG. 3 is that all such devices, including resonant harmonic generators, parametric devices such as that shown and resonant sum-frequency mixers, have like ranges of the geometrical factors involved for optimum results. That is, they have the same range of the focusing parameter $\xi$. The optimum range of the parameter $\xi$ for resonant embodiments is shown by the shaded area in the curves of FIG. 4.

The principal difference from the nonresonant embodiments is the substantial broadening of the peaks of the curves, especially for substantial values of the double refraction parameter B. A related difference is the shifting of the peaks of the curves substantially to smaller values of $\xi$ for substantial values of the double refraction parameter B.

Resonant parametric oscillator

As a first example of a resonant embodiment of our invention, let us first consider a simplified version of FIG. 3 in which the signal source 35 is not required. Such an example is a parametric oscillator.

In order to make the example as simple as possible, let us again consider the use of tellurium. Thus, crystal 31 is a tellurium crystal with a low concentration of free carriers. The resonator formed by reflectors 38 and 39 is made resonant at both the signal frequency $\omega_1$ and the idler frequency $\omega_2$. The pumping radiation of frequency $\omega_3$ is propagated at the phase-matching angle $\theta_m$. Let us assume that $\theta_m$ is approximately 7°, as for the tellurium amplifier example for FIG. 1. The pump wavelength is illustratively 10.6 microns, the generated "signal" wavelength is 17.9 microns and the generated idler wavelength is 25.9 microns.

Now let us assume a crystal length of 0.14 centimeter. The desirability of this choice will be shown hereinafter. From the known value of $\rho$ for Te under this circumstance one can compute a value of $B \approx 1$. From the curves of FIG. 4, for $B=1$, we obtain $\xi$ equal to about 1.5.

The generated wavelengths $\omega_1$ and $\omega_2$ in the foregoing example can be varied by varying temperature or an applied electric field. See Pat. No. 3,328,723, issued to J. A. Giordmaine et al. on June 27, 1967 and assigned to the assignee hereof. Typically, refectors 38 and 39 can be sufficiently broadband that they will support oscillation at the varied frequencies $\omega_1$ and $\omega_2$. It is, of course, still preferable not to resonate the pumping radiation.

Optimization of crystal length

This resonant parametric oscillator has a threshold and thus provides us with an example in which the crystal length itself can be optimized, inasmuch as a tellurium crystal has a significant optical loss. It may be noted that in FIG. 4, the $h_m$ ordinate value is the geometrically variable part of the reciprocal of the threshold in cases where a threshold exists. The existence of optimum crystal lengths is very significant in those cases in which the resonant nonlinear interaction has a threshold, as is the case for parametric oscillation. Our theory shows the following relationships. The parametric oscillation threshold $P_3$ is proportional to $$\epsilon_1 \epsilon_2 / l h_m(B, \xi) \tag{2}$$

The fractional losses $\epsilon_1$ and $\epsilon_2$ for the generated signal and idler waves, respectively, depend upon $l$ as follows:

$$\epsilon_1 = 1 - R_1 + \alpha_1 l \tag{3}$$

and $$\epsilon_2 = 1 - R_2 + \alpha_2 l \tag{4}$$

where $R_1$ and $R_2$ are the power reflection coefficients of the reflectors for signal and idler and $\alpha_1$ and $\alpha_2$ are losses per unit length in the body 31. We include in $1-R$ the loss at the mirrors due to scattering and transmission. The quantity $\epsilon_1 \epsilon_2 / l$ now has a minimum at $$l_0 = (1-R_1)^{1/2}(1-R_2)^{1/2}(\alpha_1 \alpha_2)^{-1/2} \tag{5}$$

In the absence of double refraction, the optimum crystal length $l_m$ equals $l_0$. In general, however, we have $l_m < l_0$ due to the rapid dropoff of the geometrical factor shown as the ordinate in the curves of FIG. 4. For the case of large double refraction such as we have in tellurium, we define $x_m$ equals $l_m/l_0$. Then the optimum value $x_m$ satisfies the cubic equation $$2\Gamma x_m^3 + 1 + 2\Gamma)x_m^2 - 1 = 0 \tag{6}$$

where $\Gamma = 1.07 \rho^2 k_0 l_0 / \pi$, $k_0$ is the degenerate frequency (one-half the highest frequency in the interaction) propagation constant and the equation for $l_0$ was just given above.

Figure 5:
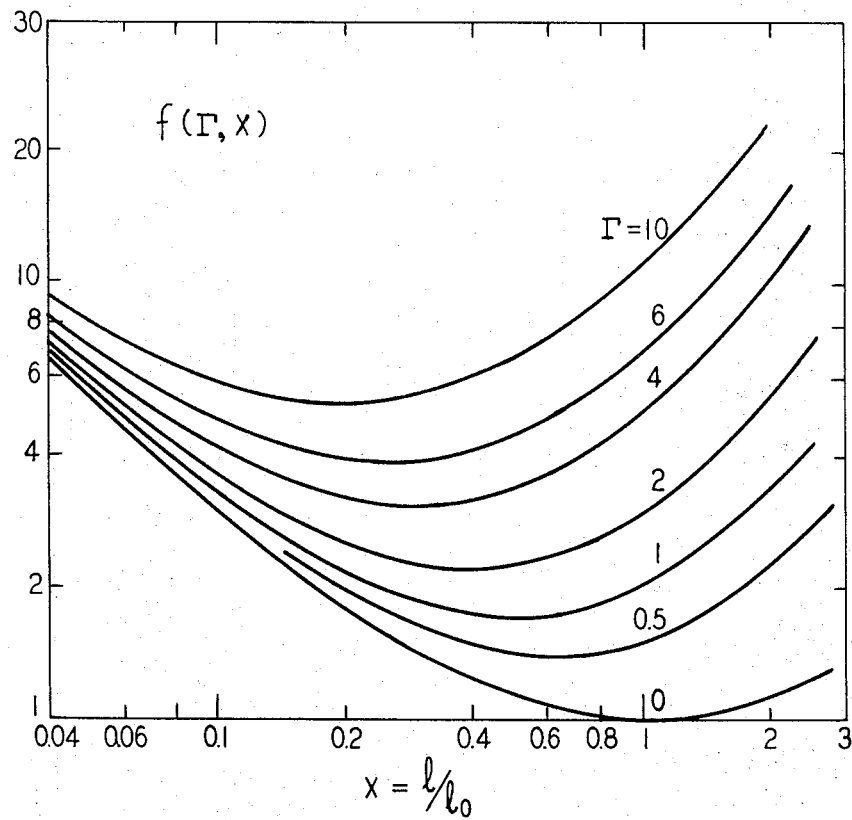
FIG. 5 shows curves which are useful in optimizing crystal lengths in resonant nonlinear optical interactions having a threshold.

Alternatively, $x_m$ may be obtained from its relationship to a function $f(\Gamma, x)$ plotted in FIG. 5. In FIG. 5, $f(\Gamma, x)$ is a loss-dependent portion of the expression of the pumping power threshold for parametric energy transfer to the signal and idler in a resonant process. These curves are employed by seeking values near the minimum ordinate value for the appropriate value of $\Gamma$, where $\Gamma$ is obtained as explained above. The corresponding $x_m$ is then read from the abscissa (horizontal axis). For our specific example employing tellurium, assuming $$1 - R_1 = 1 - R_2 = .05$$

and $\alpha_1 = \alpha_2 = .1$ cm.$^{-1}$, we obtain $l_0$ equals 0.5 centimeter and $l_m$, which is the pertinent crystal path length, equal to 0.14 centimeter, as mentioned previously. For a traveling-wave nonlinear optical interaction, this is a surprisingly short crystal length.

Moreover, optimum crystal lengths can be shown to exist for lossy crystals even when the interaction does not have a threshold. Thus, the embodiments of FIG. 1 can be somewhat refined in this respect, by employing loss calculations similar to those just described.

We find a pumping power threshold of approximately one watt for parametric generation for the specific example employing tellurium and the carbon dioxide laser with optimized focusing parameter $\xi$ optimized double refraction parameter B and optimized crytal length.

If only one frequency is resonated such as for example $\omega_2$ while $\omega_1$ is not resonated, a threshold still exists. The above Equation 2, as written, does not apply rigorously; but this case is approximately equivalent to setting $\epsilon_1 \sim 1$ for the nonresonant frequency $\omega_1$. The optimization criteria are still approximately applicable.

Resonant parametric oscillator without double refraction

Similarly, for a specific example of a resonant oscillator embodiment employing lithium niobate pumped by an argon-ion laser at 0.5147 micron supplied as an extraordinary wave in producing degenerate signal and idler waves as ordinary waves at 1.0294 microns, with phasematching normal to the optic axis ($\theta_m$ equals 90°, B equals 0), and a focusing parameter $\xi$ equals 2.84, we find a threshold for parametric generation of 22 milliwatts in a crystal one centimeter long. As for the preceding example, this example assumes an arrangement as in FIG. 3, but without source 35.

Resonant parametric oscillator with double refraction

A third specific example of a resonant embodiment employs a parametric oscillator in which a lithium niobate crystal 31 is pumped by the neodymium laser (yttrium aluminum garnet host material) at 1.0648 microns. At this pumping wavelength, lithium niobate appears to be less susceptible to optically induced damage than at 0.5147 micron. For room temperature operation, we calculate operating conditions as follows: $\theta$ equals 43.2°, $\rho$ equals 0.0374 radians, and $B$ equals 3. The effective nonlinear coefficient, $\chi$, equals $3.0 \times 10^{-8}$ esu. In this case, we find that a crystal length $l$ equals 0.4 centimeter is adequate; and essentially nothing would be gained by using a longer crystal. The focusing parameter $\xi$ would be about 0.6 in view of the fact that the double refraction parameter $B$ is 3 for the angle of incidence described. This fact may be verified by reference to FIG. 4.

Resonant devices with lossless crystals and double refraction

In fact, we have found a very useful approximate relationship for lossless crystals. This relationship tends to indicate practical relationships even for lossy crystals. Specifically, the reciprocal of the parametric oscillator threshold in a resonant interaction is approximately proportional to $B^2 \cdot \bar{h}_{mm}(B)$, as can be seen from (2), where $\bar{h}_{mm}(B)$ is a plot of the curves of FIG. 4 versus $B$ at optimum $\xi_m$. From this relationship, we can show that very little is gained in a resonant interaction by increasing $B$ beyond 3. Thus, we have chosen $B=3$ in the preceding example with lithium niobate. Then, we recall that $B$ is given by the formula in the Summary of the Invention. From this relationship, we calculate $l=0.4$ centimeter for our last example.

For fractional losses $\epsilon_1$ equals $\epsilon_2$ equals 0.01 in the last example, we obtain a threshold pump power of 4.5 watts. We see that double refraction has proved very costly in terms of the required pumping power threshold, even for optimized focusing.

Figure 4:
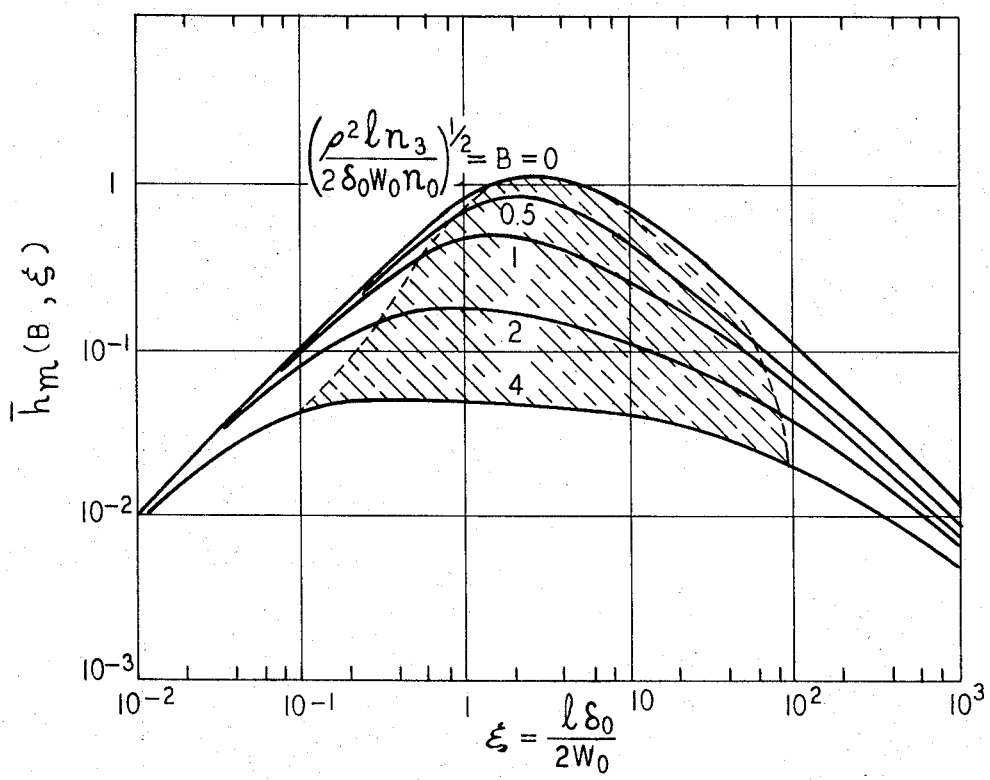
FIG. 4 shows curves which are useful in defining the optimum ranges of the focusing parameter for resonant embodiments of the invention.

It can be shown that the threshold without double refraction (for example, at a temperature of 750° C., with propagation normal to the optic axis) would have been a factor of 10 lower. The optimum focusing parameter $\xi$ would then be 2.84, as shown in FIG. 4 for $B$ equals 0.

The empirically preferred range of the focusing parameter $\xi$ equals $l\delta_0/2w_0$ is indicated on the drawing with FIG. 3 and is the same for all resonant embodiments, namely:

$$1.5 - B^{1/4} \leq \xi \leq 6(1 + 10B^{1/4}) \tag{7}$$

It is to be understood that we prefer operation in the portion of the shaded areas for which $B \leq 4$.

Resonant parametric mixer

As a further specific example of the resonant emobdiment of FIG. 3, employing a source 35, let us consider parametric mixing for up-conversion from 10.6 microns to .6729 micron employing a helium-neon laser as a pump at 0.6328 micron and a nonlinear crystal 31 of mercury sulfide (HgS), commonly called alpha cinnabar, having a free charge carrier concentration equal to or less than $1 \times 10^{17}$ per cubic centimeter. Crystal 31 is provided with reflectors 38 and 39. Accordingly, pumping source 32 is the helium-neon laser at .6328 micron, the signal source 35 comprises a carbon dioxide laser at 10.6 microns and suitable modulators which have modulated information onto the 10.6 micron beam, and the utilization apparatus 34 is a photodetector responsive to radiation at the difference frequency, for which the wavelength is 0.6729 micron. For example, apparatus 34 may then be an ordinary photomultiplier. The effective nonlinear coefficient, $\chi$, we estimate to be $3.0 \times 10^{-7}$ e.s.u.

In a parametric mixer, the ordinate $\bar{h}_m$ of FIG. 4 represents the geometrically variable portion of the power transferred to the difference-frequency or sum-frequency wave in the mixing process for a crystal of length $l$. Specifically, $P_2$ is proportional to $$P_3 P_1 \bar{h}_m(B, \xi) \tag{8}$$

In choosing $l$ in the presence of double refraction when bulk loss in the material is negligible, nothing is to be gained in increasing $l$ such that $B$ exceeds approximately 3. Let us choose $B=4$ for simplicity in using the curves of FIG. 4. The desirable path length $l$ is calculated from the formula for $B$ to be about 0.07 centimeter. A crystal any longer introduces more loss.

From FIG. 4, we see that the optimum value of the focusing parameter is about 0.2.

Other parametric mixers

If we could produce a similar interaction in a nonlinear crystal which permitted phase-matching normal to the optic axis, we could increase the quantum efficiency of the interaction and could operate with a focusing parameter $\xi$ of 2.84. It may be that this result can be achieved in crystals of proustite ($Ag_3AsS_3$) or pyrargyrite ($Ag_3SbS_3$) of similarly low free charge carrier concentration. It is also possible to employ sum-frequency mixing in the embodiment of FIG. 3 in crystals of mercury sulfide, proustite or pyrargyrite employing the 1.06 micron YAG:Nd laser. To up-convert the 10.6 micron carbon dioxide laser radiation, the source 32 would be the 1.06 micron neodymium laser and the sum frequency received at apparatus 34 would be 0.964 micron, which is within the usable range of infrared photomultipliers.

Optimum focusing is again determined by the same consideration that nothing is to be gained in resonant situations by increasing $B$ beyond 3, and by the use of FIG. 4. Similarly, a desirable path length $l$ is calculated.

Except for the differences which result from the differences of the curves of FIG. 4 from the curves of FIG. 2, the operation of the resonant embodiment of FIG. 3 is essentially similar to that of the nonresonant embodiments of FIG. 1. In general, the effects of the resonance conditions for the nonlinear interaction can be accounted for with the coefficients $q$ and $r$ as set out in the general inequality in the Summary of the Invention above.

Our invention was referred to in the article by E. F. Labuda and A. M. Johnson, "Continuous Second Harmonic Generation of $\lambda$ 2572 A. Using the Argon II Laser," I.E.E.E. Journal of Quantum Electronics, volume QE-3, page 164 (April 1967) and formed the basis for their experiments.

We claim:

1. A nonlinear optical device comprising a body of an optically reactively nonlinear substantially transparent active medium, said body having an effective length $l$ in a direction suitable for a substantially phase-matched nonlinear interaction characterized by a half-frequency beam waist $2w_0$, a diffraction angle $\delta_0$ and a double refraction angle $\rho$, said body having an index of refraction $n_3$ for the highest frequency involved in said interaction and an index of refraction $n_0$ for the half-frequency, where the half-frequency is one-half the highest frequency involved in said interaction, and means for supplying a beam of coherent radiation to said body to propagate in the direction of the length $l$ with polarization to drive a nonlinear interaction in said body, said supplying means including means for focusing said beam to provide a focusing parameter $\xi$ equal to $l\delta_0/2w_0$ which is greater than 1.5 minus $$q\left[\frac{\rho^2 l n_3}{2\delta_0 w_0 n_0}\right]^{1/8}$$

and is less than $$6\left[1+r\left(\frac{\rho^2 l n_3}{2\delta_0 w_0 n_0}\right)^{1/8}\right]$$

where $q$ and $r$ are parameters related to resonance conditions for said interaction, $q$ and $r$ being non-negative real numbers, the double refraction parameter $$\left[\frac{\rho^2 l n_3}{2\delta_0 w_0 n_0}\right]^{1/2}$$

equal to B being less than or equal to 2.0.

2. A nonlinear optical device according to claim 1 in which the body is adapted for essentially a nonresonant interaction and in which the focusing means is adapted to provide a focusing parameter $\xi$ in a range for which $q$ equals 0.5 and $r$ equals 0.

3. A nonlinear optical device according to claim 1 in which the body is adapted for a resonant interaction, reflectors being disposed about the body to form an optical resonator and adapted to provide a reflectively substantially exceeding transmission plus reflector losses at the frequency of an optical radiation generated in said interaction, and in which the focusing means is adapted to provide a focusing parameter $\xi$ in a range for which $q$ equals 1.0 and $r$ equals 10.

4. A nonlinear optical device according to claim 1 in which the body of material is capable of a substantial nonlinear interaction in the direction of the length $l$ with double refraction angle $\rho$ approximately equal to zero.

5. A nonlinear optical device according to claim 4 in which the focusing means provides a focusing parameter $\xi$ approximately equal to 2.84.

6. A nonlinear optical device according to claim 3 in which the focusing means is adapted to provide a focusing parameter $\xi$ which ranges from a value of approximately 2.84 for a double refraction parameter that is approximately zero to a value of approximately unity for a double refraction parameter B that is approximately 2.

7. A nonlinear optical device according to claim 6 in which the frequency and polarization of the supplied radiation and the effective birefringence of the body of material in the direction of length $l$ are appropriate for generating the second harmonic of the supplied radiation in the nonlinear interaction.

8. A nonlinear optical device according to claim 1 in which the supplying means supplies a plurality of coherent radiations of frequencies and polarizations appropriate for parametric interaction while propagating in the direction of length, $l$, the focusing means including means for providing the same focusing parameter for all of said radiations, said focusing parameter lying in the range for which $q$ is one of the values 0.5 and unity and $r$ is one of the values zero and 10.

9. A resonant parametric device comprising a body of an optically reactively nonlinear substantially transparent active medium, said body having an effective length $l$ in a direction suitable for a substantially phase-matched nonlinear interaction characterized by a degenerate-frequency beam waist $2w_0$, a diffraction angle $\delta_0$ and a double refraction angle $\rho$, said body having an index of refraction $n_3$ for the highest frequency involved in said interaction and an index of refraction $n_0$ for the half-frequency, where the half-frequency is one-half the highest frequency involved in said interaction, and means for supplying a beam of coherent radiation to said body to propagate in the direction of the length $l$ with polarization to drive a nonlinear interaction in said body, reflectors being disposed about the body to form an optical resonator, said supplying means including means for focusing said beam to provide a focusing parameter $\xi$ which is greater than 1.5 minus $B^{1/4}$ and is less than $6(1+10B^{1/4})$, the double refraction parameter B being less than or equal to 4, where $$\xi = \frac{l\delta_0}{2w_0},\ B = \left[\frac{\rho^2 l n_3}{2\delta_0 w_0 n_0}\right]^{1/2}$$

10. A parametric device according to claim 9 in which the means for focusing is adapted to provide a focusing parameter $\xi$ that is substantially equal to 2.84 for no double refraction and that is substantially equal to successive values smaller than 2.84 varying smoothly down to approximately 0.6 for values of the double refraction parameter B near 4.

References Cited

UNITED STATES PATENTS

| | | | |
|---|---|---|---|
| 3,201,709 | 8/1965 | Boyd | 330—4.5 |
| 3,235,813 | 2/1966 | Kegelnik et al. | 330—4.3 |
| 3,267,385 | 8/1966 | Ashkin | 330—4.6 |
| 3,297,875 | 1/1967 | Garwin et al. | 330—4.5 |
| 3,364,432 | 1/1968 | Boyd | 307—88.3 |
| 3,364,433 | 1/1968 | Freund et al. | 330—4.6 |
| 3,387,204 | 6/1968 | Ashkin et al. | 321—69 |
| 3,392,368 | 7/1968 | Brewer et al. | 307—88.3 |

ROY LAKE, Primary Examiner

D. R. HOSTETTER, Assistant Examiner

U.S. Cl. X.R.

321—69; 330—4.5, 4.6, 5, 56; 331—107; 350—160